United States Patent
Sawada et al.

(10) Patent No.: US 10,543,571 B2
(45) Date of Patent: Jan. 28, 2020

(54) CU-ADDED NI—CR—FE-BASED ALLOY BRAZING MATERIAL

(71) Applicant: Sanyo Special Steel Co., Ltd., Himeji-shi (JP)

(72) Inventors: Toshiyuki Sawada, Himeji (JP); Shingo Fukumoto, Himeji (JP)

(73) Assignee: Sanyo Special Steel Co., Ltd., Himeji-shi (JP)

( * ) Notice: Subject to any disclaimer, the term of this patent is extended or adjusted under 35 U.S.C. 154(b) by 0 days.

(21) Appl. No.: 16/234,845

(22) Filed: Dec. 28, 2018

(65) Prior Publication Data

US 2019/0134761 A1 May 9, 2019

Related U.S. Application Data

(63) Continuation of application No. 14/909,828, filed as application No. PCT/JP2014/069736 on Jul. 25, 2014.

(30) Foreign Application Priority Data

Aug. 6, 2013 (JP) ................................. 2013-162961
Jun. 16, 2014 (JP) ................................. 2014-123074

(51) Int. Cl.
| | |
|---|---|
| *B23K 35/30* | (2006.01) |
| *C22C 30/02* | (2006.01) |
| *C22C 30/04* | (2006.01) |
| *C22C 30/06* | (2006.01) |
| *C22C 19/05* | (2006.01) |

(52) U.S. Cl.
CPC ............ *B23K 35/304* (2013.01); *B23K 35/30* (2013.01); *B23K 35/3033* (2013.01); *C22C 19/05* (2013.01); *C22C 19/055* (2013.01); *C22C 19/056* (2013.01); *C22C 19/058* (2013.01); *C22C 30/02* (2013.01); *C22C 30/04* (2013.01); *C22C 30/06* (2013.01)

(58) Field of Classification Search
CPC combination set(s) only.
See application file for complete search history.

(56) References Cited

U.S. PATENT DOCUMENTS

| | | |
|---|---|---|
| 2010/0028716 A1 | 2/2010 | Nuetzel et al. |
| 2011/0014491 A1 | 1/2011 | Mars et al. |
| 2011/0020166 A1 | 1/2011 | Otobe et al. |

FOREIGN PATENT DOCUMENTS

| | | | |
|---|---|---|---|
| CN | 1593836 A | 3/2005 | |
| CN | 101693326 A | 4/2010 | |
| CN | 102006968 A | 4/2011 | |
| JP | 2009545451 A | 12/2009 | |
| JP | 2010269347 A | 12/2010 | |
| JP | 2011515223 A | 5/2011 | |
| JP | 2012183574 A | 9/2012 | |
| WO | 2013077113 A1 | 5/2013 | |
| WO | WO-2013077113 A1 * | 5/2013 | ............. B23K 35/30 |

OTHER PUBLICATIONS

Google patents translation of WO2013077113 (Year: 2019).*
Spiekermann; "Legierungen—ein besonderes patentrechtliches Problem? Legierungsprufung im Europaischen Patentamt"; Mitteilungen der deutschen Patentanwalte; 1993; pp. 178-190.

* cited by examiner

*Primary Examiner* — Christopher S Kessler
(74) *Attorney, Agent, or Firm* — The Webb Law Firm

(57) ABSTRACT

A Ni—Cr—Fe-based alloy brazing filler material to which Cu is added, and which has a low melting temperature, and is inexpensive and excellent in corrosion resistance and in strength, for use in manufacture of stainless-steel heat exchangers or the like, specifically, a Ni—Cr—Fe-based alloy brazing filler material, including, in mass %, Cr: 15 to 30%; Fe: 15 to 30%; Cu: 2.1 to 7.5%; P: 3 to 12%; and Si: 0 to 8%; and the balance being Ni and unavoidable impurities, wherein the total content of Cr and Fe is 30 to 54%, and the total content of P and Si is 7 to 14%.

4 Claims, 7 Drawing Sheets

CU-ADDED NI—CR—FE-BASED ALLOY BRAZING MATERIAL

CROSS-REFERENCE TO RELATED APPLICATIONS

The present application is a continuation application of U.S. patent application Ser. No. 14/909,828 filed on Feb. 3, 2016, which is the United States national phase of International Application No. PCT/JP2014/069736 filed Jul. 25, 2014, which claims priority to Japanese Patent Application No. 2013-162961 filed on Aug. 6, 2013, and Japanese Patent Application No. 2014-123074 filed on Jun. 16, 2014, the disclosures of which are hereby incorporated in their entirety by reference.

BACKGROUND OF THE INVENTION

Field of the Invention

The present invention relates to a Ni—Cr—Fe-based alloy brazing filler material to which Cu is added, and which has a low melting temperature, and is inexpensive and excellent in corrosion resistance and in strength, for use in manufacture of stainless-steel heat exchangers or the like.

Background Art

Ni-based alloy brazing filler materials superior in corrosion resistance and oxidation resistance have been conventionally used for brazing stainless steel, and in particular, BNi-2 (Ni—Cr—Fe—B—Si alloy), BNi-5 (Ni—Cr—Si alloy), and BNi-7 (Ni—Cr—P alloy) as JIS standards have been frequently used. The above three types of Ni-based brazing filler materials each have an advantage and a disadvantage, and have been used differently depending on application. For example, BNi-2 has a relatively low liquidus-line temperature of about 1000° C. while its corrosion resistance is not necessarily sufficient, and BNi-5 is superior in corrosion resistance while its liquidus-line temperature is about 1140° C., which necessitates a high brazing temperature.

In addition, BNi-7 has an extremely low liquidus-line temperature of about 900° C. and a relatively excellent corrosion resistance. However, a Ni—P alloy base material is used for adding P, and the base material is relatively less available to thereby raise a supply concern. In this way, since there is no Ni-based brazing filler material having both of a low liquidus-line temperature and a superior corrosion resistance and comprising a raw material that is relatively easily available, there has been a need for developing a new alloy brazing filler material.

With regard to these problems, there has been proposed, for example in JP2010-269347A (Patent Literature 1), a Ni—Cr—Cu—Fe-based brazing filler material having a low liquidus-line temperature, a high strength, and a high corrosion resistance. To this Ni—Cr—Cu—Fe-based brazing filler material, Cr is added for improvement in corrosion resistance, Fe is added for price reduction, and Cu is added for improvement in spreading properties in brazing. In addition, there has been proposed, in JP2012-183574A (Patent Literature 2), a Ni-based alloy brazing filler material in which some of Ni elements can be substituted with Fe while maintaining a high corrosion resistance. To this Ni-based alloy brazing filler material, Cu is added together with Cr for improvement in corrosion resistance.

CITATION LIST

Patent Literature

[Patent Literature 1] JP2010-269347A
[Patent Literature 2] JP2012-183574A

SUMMARY OF THE INVENTION

Such a brazing filler material as described above contains Fe having a brazing property at a low temperature and a high corrosion resistance as well as an excellent availability and an excellent inexpensiveness, and is an excellently developed brazing filler material; however, in recent years, further high strength has been increasingly required. Thus, the present inventors intensively examined a novel brazing filler material achieving a high brazing property at a low liquidus-line temperature, a high corrosion resistance, a high raw material availability, a high inexpensiveness, and, in addition, a high strength.

In particular, with regard to a Ni—Cr—Fe-based alloy, the influence of the amount of added Cu on a strength was examined in detail, the strength was found to be improved by adding a small amount of Cu, and the present invention was thus accomplished. Although there has been an example in which the amount of added Cu was examined from the viewpoint of corrosion resistance and brazing properties in a Ni-based brazing filler material to which Cu is added in such a manner as in the above patent literature, there has been no example in which the amount of added Cu was examined from the viewpoint of strength, and any phenomenon of improving strength in the component ranges of the present invention, in particular, in the range of the amount of added Cu has not been suggested at all.

According to an aspect of the present invention, there is provided a Ni—Cr—Fe-based alloy brazing filler material, comprising, in mass %, Cr: 15 to 30%; Fe: 15 to 30%; Cu: 2.1 to 7.5%; P: 3 to 12%; and Si: 0 to 8%; and the balance being Ni and unavoidable impurities, wherein the total of Cr and Fe is 30 to 54%, and the total of P and Si is 7 to 14%.

According to another aspect of the present invention, there is provided a Ni—Cr—Fe-based alloy brazing filler material, comprising, in mass %,
Cr: 15 to 30%;
Fe: 15 to 30%;
Cu: 2.1 to 7.5%;
P: 3 to 12%; and
Si: 0 to 8%; and
the balance being Ni and unavoidable impurities,
wherein the total content of Cr and Fe is 30 to 54%, and the total content of P and Si is 7 to 14%.

According to still another aspect of the present invention, there is provided the above Ni—Cr—Fe-based alloy brazing filler material, comprising: 1% or less in total of one or two of B and C; and/or 5% or less in total of one or more of Mo, Co, Mn, and V; and/or 2% or less in total of one or more of Sn, Zn, and Bi.

According to still another aspect of the present invention, there is provided the above Ni—Cr—Fe-based alloy brazing filler material, comprising:
1% or less in total of at least one of B and C;
5% or less in total of at least one of Mo, Co, Mn, and V; and/or
2% or less in total of at least one of Sn, Zn, and Bi.

In accordance with the present invention, there can be provided a Ni—Cr—Fe-based alloy brazing filler material to which Cu is added, and which has a low melting temperature, and is inexpensive and excellent in corrosion resistance and in strength, for use in manufacture of stainless-steel heat exchangers or the like.

BRIEF DESCRIPTION OF DRAWINGS

FIG. 1A is a view showing an optical micrograph showing the structure of a 0.2% Cu alloy.
FIG. 1B is a view showing an optical micrograph showing the structure of a 0.2% Cu alloy.

DETAILED DESCRIPTION OF THE INVENTION

The present invention is explained in detail below. Unless otherwise specified, "%" indicates herein mass %.

One of the features of the present invention is based on a finding that a strength is increased by adding a small amount of Cu. In this alloy system, the strength is not monotonously varied by adding a small amount of Cu, and the strength is increased by small-amount addition while the strength is decreased by excessive addition. The causes of such a complicated variation in strength, estimated from the viewpoint of a microstructure, are described below.

FIGS. 1 to 4 show the microstructures of centrifugal cast steels in which the values of Cr, Fe, P, and Si are constant within the ranges of components in the present invention, and only the amount of Cu is changed to 0.2%, 4.0%, 7.9%, and 15.3% (hereinafter, each alloy is expressed by "0.2% Cu alloy" or the like according to the amount of Cu). In each drawing, (a) shows a photograph at a low magnification, and (b) shows a photograph at a high magnification. In other words, FIG. 1 is a view showing optical micrographs showing the structure of a 0.2% Cu alloy, in which FIG. 1A is the optical micrograph at a low magnification while FIG. 1B is the optical micrograph at a high magnification.

Figure 2B:
FIG. 2B is a view showing an optical micrograph showing the structure of a 4.0% Cu alloy.
Figure 2A:
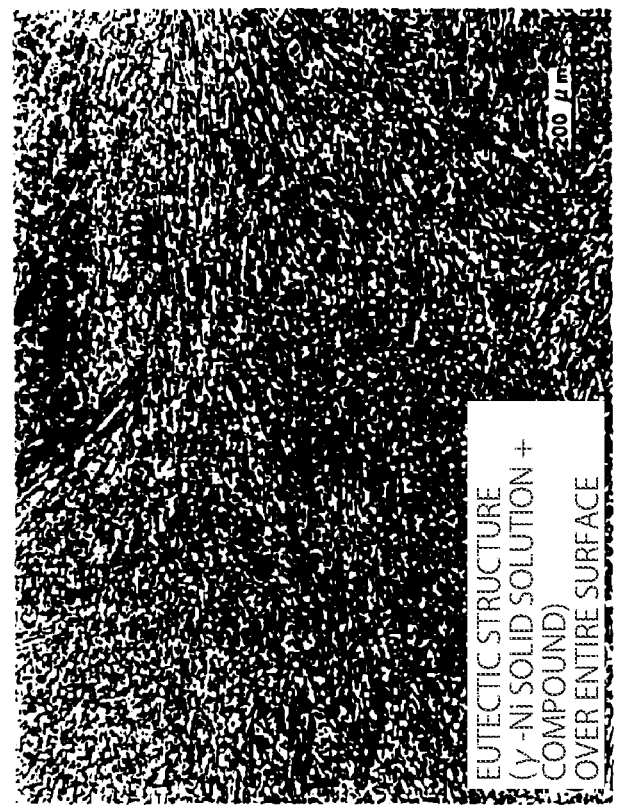
FIG. 2A is a view showing an optical micrograph showing the structure of a 4.0% Cu alloy.
Figure 3A:
FIG. 3A is a view showing an optical micrograph showing the structure of a 7.9% Cu alloy.
Figure 3B:
FIG. 3B is a view showing an optical micrograph showing the structure of a 7.9% Cu alloy.
Figures 4A, 4B:
FIG. 4A is a view showing an optical micrograph showing the structure of a 15.3% Cu alloy.
FIG. 4B is a view showing an optical micrograph showing the structure of a 15.3% Cu alloy.

Similarly, FIG. 2 is a view showing optical micrographs showing the structure of a 4.0% Cu alloy, in which FIG. 2A is the optical micrograph at a low magnification while FIG. 2B is the optical micrograph at a high magnification. Further, FIG. 3 is a view showing optical micrographs showing the structure of a 7.9% Cu alloy, in which FIG. 3A is the optical micrograph at a low magnification while FIG. 3B is the optical micrograph at a high magnification. FIG. 4 is a view showing optical micrographs showing the structure of a 15.3% Cu alloy, in which FIG. 4A is the optical micrograph at a low magnification while FIG. 4B is the optical micrograph at a high magnification.

Further, the bending strengths of these centrifugal cast steels are 990 MPa, 1170 MPa, 810 MPa, and 620 MPa, respectively, and the 4.0% Cu alloy within the scope of the present invention shows a much higher strength than the other alloys. In the 0.2% Cu alloy, a relatively coarse dendritic primary crystal (γ-Ni solid solution) is observed as shown in FIG. 1A, and there is a fine eutectic structure (γ-Ni solid solution+compound (phosphide and silicide)) around the dendritic primary crystal as shown in FIG. 1B. In general, the γ-Ni solid solution has a high ductility, the compound (phosphide and silicide) is brittle, and the rupture of a material having a hypoeutectic structure as shown in FIG. 1A allows cracks to spread in a eutectic structure portion containing a large amount of the brittle compound, thereby allowing fracture to occur.

In contrast, in the 4.0% Cu alloy, no dendritic primary crystal is observed as shown in FIG. 2A, and the whole surface thereof has a eutectic structure. Further, FIG. 2B, in which the eutectic structure is enlarged, obviously reveals that the area proportion of a γ-Ni solid solution in the eutectic structure is high compared to the 0.2% Cu alloy. Because the 0.2% Cu alloy and the 4.0% Cu alloy have equal amounts of P and Si which generate the compound, it is presumed that generally equal amounts of phosphide and silicide are generated, and therefore, it is considered that the 0.2% Cu alloy and the 4.0% Cu alloy have a generally equal amount of γ-Ni solid solution.

As described above, it is considered that in a situation in which a generally equal amount of γ-Ni solid solution is generated, the 0.2% Cu alloy in which the coarse γ-Ni solid solution primary crystal is generated results in the decreased area proportion of the γ-Ni solid solution in the eutectic structure, thereby generating a brittler eutectic structure than that of the 4.0% Cu alloy, thereby still having a low strength. Conversely, it is considered that the 4.0% Cu alloy shows a high resistance to cracks spreading mainly in a eutectic structure and has an excellent strength because the 4.0% Cu alloy generates the eutectic structure having a high γ-Ni solid solution area proportion and a high ductility although the amounts of P and Si of the 4.0% Cu alloy are equal to those of the 0.2% Cu alloy.

In the 7.9% Cu alloy to which an increased amount of Cu is added, a relatively coarse angular primary crystal (phosphide) is observed as shown in FIG. 3A. It is obviously considered that this angular coarse phosphide becomes a fracture origin. Thus, it is considered that the 7.9% Cu alloy still has a low strength although having a eutectic structure having a relatively high γ-Ni solid solution area proportion similarly with the 4.0% Cu alloy as shown in FIG. 3B.

In the 15.3% Cu alloy to which a further increased amount of Cu is added, a spherical phase having a high Cu concentration, considered to be subjected to liquid-phase separation, is observed, and an abundance of stick coarse phosphide is observed, as shown in FIG. 4A. In a binary phase diagram, Cu is a complete solid solution type with Ni and is a peritectic type with Fe and Cr. It is known that a peritectic type phase diagram is changed to a monotectic type involving liquid phase separation due to change in the activity of a solute by other added elements.

It is considered that the 15.3% Cu alloy contains, as base elements, large amounts of Cr and Fe forming a peritectic type phase diagram with Cu, and a monotectic type phase diagram in which Cu which is a solute element generates a second liquid phase is formed by the action of P and Si. Further, it is considered that the separation of the phase having a high Cu concentration as the second liquid phase results in concentration of P and Si in a matrix which is a first liquid phase, thereby generating an abundance of coarse phosphide as shown in FIGS. 4A and 4B, and extremely decreasing a strength.

As described above, it is presumed that when the amount of added Cu is changed in this alloy system, a strength is increased by increasing a γ-Ni solid solution area proportion in a eutectic structure in small-amount addition while the strength is decreased due to generation of angular coarse phosphide and/or generation of a second liquid phase having a high Cu concentration and stick coarse phosphide in excessive addition.

The above-described microstructure is a solidification structure in a centrifugal casting step, and a bending strength is possessed by a test piece cut out of such a centrifugation cast steel. It is confirmed that when a base material such as stainless steel is brazed with such alloy brazing filler materials, the fillet portion thereof has a generally similar solidification structure. Thus, the bending strengths of brazing portions in Examples and Comparative Examples described later tend to be generally similar to the bending strength of the test piece cut out of the centrifugal cast steel.

It was also found that the addition of Cu has an advantage other than strength. In other words, liquidus-line and solidus-line temperatures are varied by increasing the amount of added Cu, of which the details will be described in Examples and Comparative Examples. For example, in the case of the alloys having the four compositions described above, the liquidus-line temperatures of the alloys in order of increasing Cu are 1050° C., 1040° C., 1060° C., and 1140° C., respectively. This is because the evaluation of the microstructures in FIGS. 1 to 4 shows that the 0.2% Cu alloy is hypoeutectic, and the 4.0% Cu alloy has a eutectic composition, in which a primary crystal coarse dendritic γ-Ni solid solution is crystallized in the 0.2% Cu alloy at a slightly higher temperature.

In contrast, this is because the 7.9% Cu alloy has a hypereutectic composition, and therefore, a primary crystal coarse angular phosphide is also crystallized at a slightly higher temperature than that in the 4.0% Cu alloy. Furthermore, this is considered to be because in the 15.3% Cu alloy, the P concentration of the first liquid phase is significantly increased by generating the second liquid phase having a high Cu concentration, and the alloy has a hypereutectic composition more similar to phosphide, and therefore, this is presumed to be because a coarse stick phosphide is crystallized at a much higher temperature than that in the 7.9% Cu alloy. Still further, it was also found that the solidus-line temperature tends to slightly decrease monotonously with increasing the amount of added Cu. As described above, there was also found the effect of decreasing the liquidus line and the solidus line, in which brazing properties are improved by adding an appropriate amount of Cu.

With regard to component elements other than Cu, points in the alloy design of the present invention will be described below. In order to decrease a liquidus-line temperature, P particularly having a low eutectic temperature with Ni was selected from B, Si, and P added in a JIS-standard composition. The eutectic composition of a Ni—P binary system is Ni-11% P. However, the use of available Fe—P rather than Ni—P having a relatively less availability was contemplated as a base material for adding P. Furthermore, the addition of Cr was considered to be essential for improving corrosion resistance. Further, the possibility of supplementarily replacing P with Si was examined because Si is an element decreasing a liquidus-line temperature in a JIS-standard composition, similarly with P.

In such a manner, the range of the amount of added Cu improving a strength was found by conducting a detailed experiment in which Cu was added in a wide range to a Ni—Cr—Fe—P system (to which Si is supplementarily added) as a basic component. Furthermore, the ranges of the additive amounts of these essential elements and other additional trace elements were determined by examination shown in Examples, and the present invention was thus accomplished.

The reason for regulating the ranges of the alloy components according to the present invention will be described below.

The Ni—Cr—Fe-based alloy brazing filler material, to which Cu is added, according to the present invention comprises, in mass %, Cr: 15 to 30%; Fe: 15 to 30%; Cu: 2.1 to 7.5%; P: 3 to 12%; and Si: 0 to 8%; and the balance being Ni and unavoidable impurities, preferably consists essentially of these elements and unavoidable impurities, and more preferably consists of these elements and unavoidable impurities, wherein the total content of Cr and Fe is 30 to 54%, and the total content of P and Si is 7 to 14%.

Cr: 15 to 30%

In the alloy of the present invention, Cr is an essential element for improving corrosion resistance. However, an increasing amount of added Cr leads to an increase in the liquidus-line temperature. The addition of 15% or more results in sufficient improvement in corrosion resistance while the addition of 30% or less enables the liquidus-line temperature to be prevented from excessively increasing. The content of Cr is preferably more than 18% and less than 28%, and more preferably more than 20% and less than 25%.

Fe: 15 to 30%

In the alloy of the present invention, Fe is an essential element because a Fe—P base material is used, and Fe also reduces a raw material cost by reducing the content of Ni which is a base metal. Furthermore, Fe slightly improves a strength unless its excessive addition. However, an increasing amount of added Fe leads to an increase in the liquidus-line temperature. Fe is added positively in an amount up to 15% because Fe in this amount can reduce the content of Ni almost without raising the liquidus-line temperature. Further, addition of Fe in an amount of 30% or less can suppress an increase in the liquidus-line temperature. The content of Fe is preferably more than 16% and less than 28%, and more preferably more than 17% and less than 25%.

Cu: 2.1 to 7.5%

In the alloy of the present invention, Cu is an essential element for improving strength, and also has the additional effect of decreasing the liquidus-line temperature and the solidus-line temperature to improve brazing properties. Furthermore, it is observed that corrosion resistance is adversely affected in the range of the amount of added Cu in which an angular or stick coarse phosphide is generated. This is presumed to be caused by a decrease in the concentration of Cr in the γ-Ni solid solution due to the high concentration of Cr in the coarse phosphide. Thus, addition of 2.1% or more of Cu results in sufficient improvement in strength, presumed to be caused by the effect of an increase in the amount of the γ-Ni solid solution in the eutectic structure, while addition of 7.5% or less of Cu can suppress a decrease in strength, presumed to be caused by the generation of the angular or stick coarse phosphide and the generation of the second liquid phase having a high Cu concentration. The content of Cu is preferably 2.5% or more and less than 6%, and more preferably more than 3% and less than 5%.

P: 3 to 12%

In the alloy of the present invention, P is an essential element for lowering the liquidus-line temperature. However, excessive addition of P in an amount beyond a eutectic composition leads to an increase in the liquidus-line temperature and a decrease in bending strength. An amount of added P of 3% or more and 12% or less enables the liquidus-line temperature to be reduced to a low level. The content of P is preferably more than 4% and less than 10%, and more preferably more than 5% and less than 8%.

Si: 0 to 8%

In the alloy of the present invention, Si is an element which can be added in combination of P because of supplementarily lowering the liquidus-line temperature, and can be added as necessary. However, similarly with P, excessive addition of Si in an amount beyond a eutectic composition leads to an increase in the liquidus-line temperature and a decrease in bending strength. An amount of added Si of 8% or less enables the liquidus-line temperature to be reduced to a low level. The content of Si is preferably more than 2% and less than 7%, and more preferably more than 3% and less than 6%.

Cr+Fe: 30 to 54%

In the alloy of the present invention, Cr and Fe are essential addition elements for the reasons described above, and the upper limit of the total amount of Cr and Fe is set at 54% because a total amount of Cr and Fe of 54% or less results in suppression of reduction in the bending strength. The lower limit of the total amount of Cr and Fe is 30% which is the total of the lower limits of the respective additive amounts of Cr and Fe. Cr+Fe is preferably more than 36% and less than 50%, and more preferably more than 40% and less than 45%. Ni is in the balance, the range of the content of Ni is not particularly restricted, and Ni has a higher cost and a lower melting point than those of Fe and Cr in comparison as a raw material of a pure metal. Thus, the content of Ni is preferably in a range of 25 to 60%, more preferably 33 to 55%, still more preferably 37 to 50%, from the viewpoint of the cost of the brazing filler material and solubility in production due to atomization or the like.

P+Si: 7 to 14%

In the alloy of the present invention, P is an essential element for the reason described above, and Si is an element which can be added supplementarily with P for the reason described above. Therefore, P+Si is equal to the content of P when Si is 0%. In the present invention, a total amount of P and Si of 7% or more enables the liquidus-line temperature to be reduced to a low level, while a total amount of P and Si of 14% or less enables reduction in bending strength to be suppressed while reducing the liquidus-line temperature to a low level. P+Si is preferably more than 8% and less than 13%, and more preferably more than 9% and less than 12%. Because there is a tendency for a low ratio of P to Si to result in a decrease in the bending strength, of which the reason is unclear, P/Si is preferably in a range of more than 1.0, more preferably more than 1.3, still more preferably more than 1.5.

B+C: 1% or Less

In the alloy of the present invention, B and C may be added in small amounts as necessary because B and C have the effect of lowering the liquidus-line temperature, which effect is less than that of P and Si, although B and C slightly deteriorate corrosion resistance. A total amount of B and C of 1% or less enables an increase in the liquidus-line temperature to be suppressed. B+C is preferably less than 0.5%, and addition of neither B nor C is more preferred. Each element of B and C is not necessarily limited to the case of adding both B and C, but only one of B and C may be added.

Mo+Co+Mn+V: 5% or Less

In the alloy of the present invention, Mo, Co, Mn, and V may be added in small amounts as necessary because Mo, Co, Mn, and V have the effect of increasing a bending strength although Mo, Co, Mn, and V slightly increase the liquidus-line temperature. A total amount of Mo, Co, Mn, and V of 5% or less enables an increase in the liquidus-line temperature to be suppressed. The total amount of Mo, Co, Mn, and V is preferably less than 2%, and addition of none of Mo, Co, Mn, and V is more preferred. Each element of Mo, Co, Mn, and V is not necessarily limited to the case of adding all of Mo, Co, Mn, and V, but it is necessary only that at least one kind thereof is added.

Sn+Zn+Bi: 2% or Less

In the alloy of the present invention, Sn, Zn, and Bi may be added in small amounts as necessary because Sn, Zn, and Bi have the effect of reducing the liquidus-line temperature although Sn, Zn, and Bi slightly decrease a bending strength. A total amount of Sn, Zn, and Bi of 2% or less enables a decrease in the bending strength to be suppressed. Sn+Zn+Bi is preferably less than 0.5%, and addition of none of Sn, Zn, and Bi is more preferred. Each element of Sn, Zn, and Bi is not necessarily limited to the case of adding all of Sn, Zn, and Bi, but it is necessary only that at least one kind thereof is added.

EXAMPLES

The present invention is explained in detail below with reference to examples.

First, in order to examine in detail the amount of added Cu influencing various properties including bending strength, the bending strength, liquidus line, and solidus line of Ni-30% Cr-20% Fe-x % Cu-7% P-3% Si were evaluated with a test piece cut out of a produced centrifugal cast steel. Furthermore, SUS304 as a base material was brazed with a specimen cut out of the centrifugation cast steel. The bending strength and corrosion resistance of the brazed test piece were evaluated (Experiment A).

Then, centrifugal cast steels in which each alloy composition was varied were produced, the bending strength, liquidus line, and solidus line of a test piece cut out of each centrifugal cast steel were evaluated, and the bending strength and corrosion resistance of a test piece obtained by brazing SUS304 as a base material with a specimen cut out of the centrifugal cast steel were evaluated (Experiment B).

For producing the centrifugal cast steel, 200 g of a molten base material weighed to contain predetermined components was melted in a refractory crucible made of alumina in argon atmosphere and was centrifugally cast into a copper mold having a diameter of 35 mm and a height of 30 mm. For the evaluation of the bending strength of the centrifugal cast steel, a test piece having a height of 2 mm, a width of 2 mm, and a length of 20 mm was collected from the produced centrifugation cast steel, and the evaluation was carried out by a three-point bending resistance test with a supporting-point distance of 10 mm. In Experiment B, the case of 1040 MPa or more was evaluated as A, the case of more than 1020 MPa and less than 1040 MPa was evaluated as B, the case of 1000 MPa or more and less than 1020 MPa was evaluated as C, and the case of less than 1000 MPa was evaluated as D.

For the evaluation of the liquidus line and solidus line of the centrifugal cast steel, around 15 mg of a small piece was cut out of the produced centrifugation cast steel, and the evaluation was carried out by a thermal analysis apparatus (DTA), For the measurement, temperature was increased from room temperature to 1200° C. at 20° C./min, and was maintained at 1200° C. for 5 min, and cooling was then performed to room temperature at −20° C./min. The evaluation was performed by regarding the start temperature of the first exothermic peak as a liquidus-line temperature and the end temperature of the final exothermic peak as a solidus-line temperature in this cooling process. The measurement was carried out in argon flow. In Experiment B, the liquidus line of 975° C. or more and less than 1000° C. was evaluated as A, the liquidus line of 1000° C. or more and less than 1025° C. was evaluated as B, the liquidus line of 1025° C. or more and less than 1050° C. was evaluated as C, and the liquidus line of 1050° C. or more was evaluated as D, while the solidus line of less than 980° C. was evaluated as A, the solidus line of 980° C. or more and less than 990° C. was evaluated as B, the solidus line of 990° C. or more and less than 1000° C. was evaluated as C, and the solidus line of 1000° C. or more was evaluated as D.

For the production of the specimen for bending strength brazed to SUS304 and the evaluation of the bending strength, a thin film specimen having a height of 10 mm, a width of 10 mm, and a length of 0.8 mm was cut out of the produced centrifugal cast steel. Then, a plane having a height of 10 mm and a width of 10 mm of the thin film specimen was put in contact with the center of a plane having a height of 20 mm and a width of 20 mm of a SUS304 block having a height of 20 mm, a width of 20 mm, and a length of 10 mm so that the diagonal lines of the plane of the thin film specimen corresponded to those of the SUS304 block, and another SUS304 block having a height of 20 mm, a width of 20 mm, and a length of 10 mm was further put thereon. The upper and lower SUS304 blocks were placed so that the four corners of the blocks facing each other corresponded to each other. This product was heated up to 1100° C. in a vacuum, was maintained for 30 min, and was brazed.

A bending resistance test piece having a height of 2 mm, a width of 2 mm, and a length that is the total of 10 mm and 10 mm of the upper and lower SUS304 blocks and a braze thickness was collected from this braze material. A braze portion is positioned at the center in the longitudinal direction of the bending resistance test piece by performing the collection so that the longitudinal direction of the bending resistance test piece is the vertical direction of the braze material. In the bending resistance test piece, the bending strength of the braze portion was evaluated with a three-point bending resistance testing machine with a supporting-point distance of 10 mm. In other words, the bending resistance test piece was placed so that the braze portion in the center in the longitudinal direction of the bending resistance test piece is at the center of the supporting points. A load was imposed on the braze portion by an indenter, thereby fracturing the braze portion. In Experiment B, the case of 550 MPa or more was evaluated as A, the case of 525 MPa or more and less than 550 MPa was evaluated as B, the case of 500 MPa or more and less than 525 MPa was evaluated as C, and the case of less than 500 MPa was evaluated as D.

For the production of the test piece for corrosion resistance brazed to SUS304 and the evaluation of the corrosion resistance of the test piece, a cubic specimen having a height of 3 mm, a width of 3 mm, and a length of 3 mm was cut out of the produced centrifugal cast steel. Then, the cubic specimen was put on the center of the circle of a SUS304 disk having a diameter of 20 mm and a thickness of 5 mm, was heated up to 1100° C. in a vacuum, was maintained for 30 min, and was brazed. On the braze material, 20% of salt water was sprayed at 35° C. for 16 hours, to evaluate corrosion resistance based on a subsequent rusting situation. The material in which no rust was generated was evaluated as A, the material on part of the surface of which rust was generated was evaluated as B, and the material over the entire surface of which rust was generated was evaluated as C.

Figure 5:
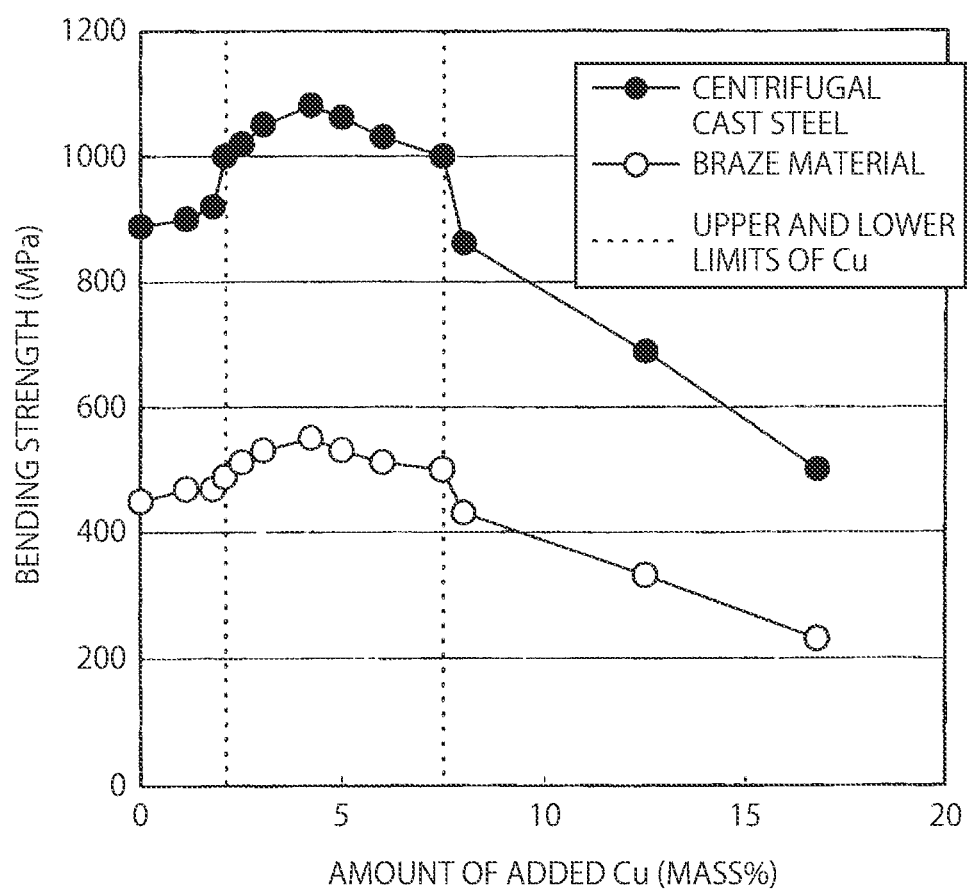
FIG. 5 is a view showing the influence of the amount of added Cu on a bending strength in a bending resistance test piece cut out of a Ni—Cr—Fe—Cu—P—Si alloy centrifugal cast steel and a bending resistance test piece cut out of a braze material.
Figure 6:
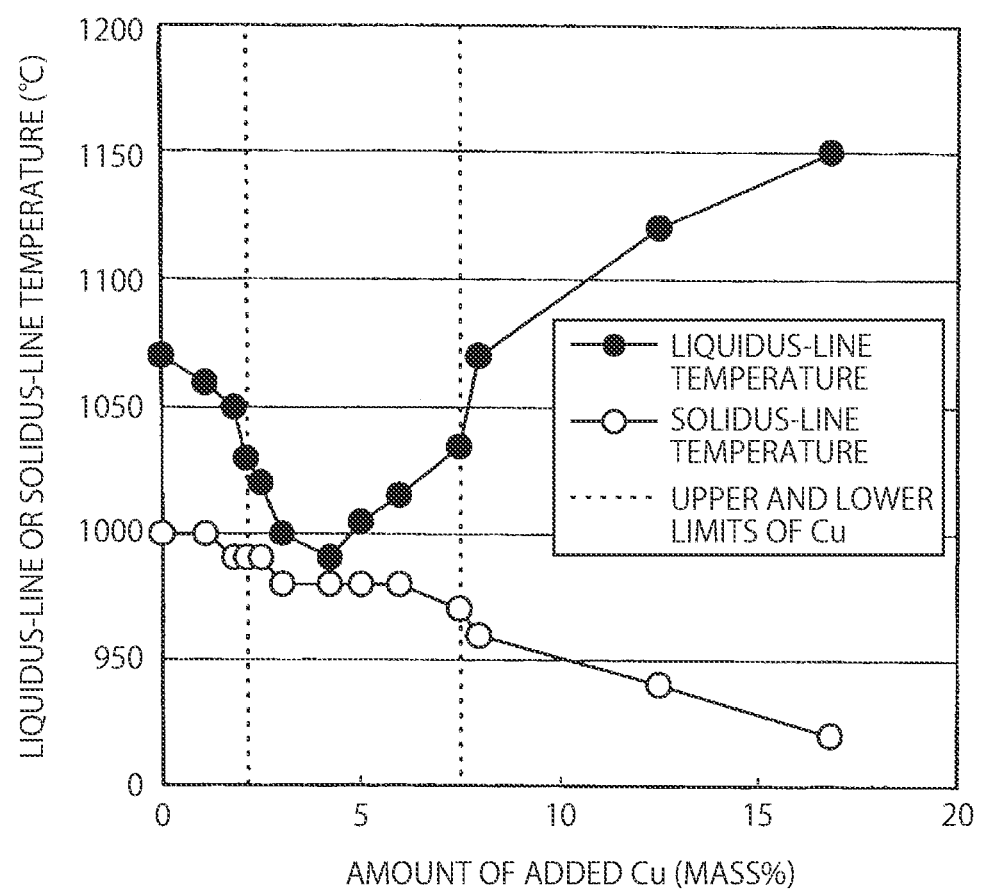
FIG. 6 is a view showing the influence of the amount of added Cu on the liquidus-line temperature and solidus-line temperature of a Ni—Cr—Fe—Cu—P—Si alloy centrifugal cast steel.
Figure 7:
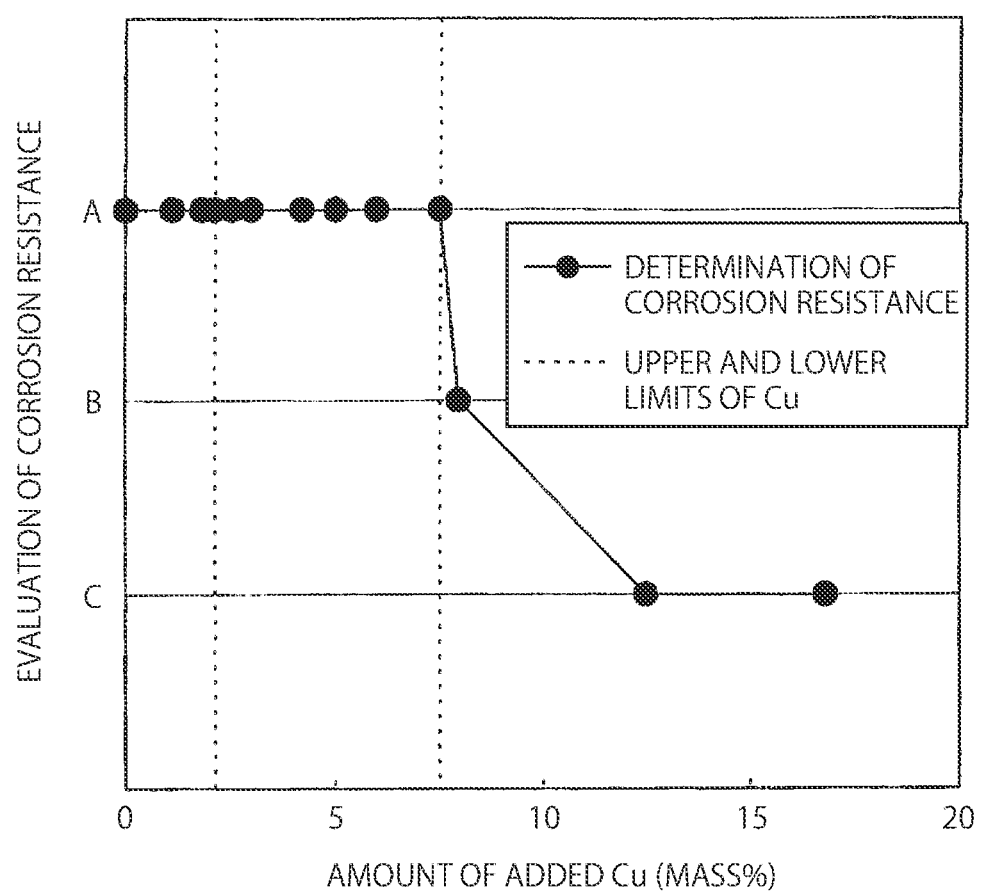
FIG. 7 is a view showing the influence of the amount of added Cu on the corrosion resistance of a Ni—Cr—Fe—Cu—P—Si alloy centrifugal cast steel.

FIG. 5 is a view showing the influence of the amount of added Cu on a bending strength in a bending resistance test piece cut out of a Ni-30% Cr-20% Fe-x % Cu-7% P-3% Si alloy centrifugal cast steel and a bending resistance test piece cut out of a braze material (Experiment A). The dotted vertical lines show the upper and lower limits of Cu. Further, FIG. 6 is a view showing the influence of the amount of added Cu on the liquidus-line temperature and solidus-line temperature of a Ni-30% Cr-20% Fe-x % Cu-7% P-3% Si alloy centrifugal cast steel Experiment A). The dotted vertical lines show the upper and lower limits of Cu. Furthermore, FIG. 7 is a view showing the influence of the amount of added Cu on the corrosion resistance of a Ni-30% Cr-20% Fe-x % Cu-7% P-3% Si alloy centrifugal cast steel (Experiment A). The dotted vertical lines show the upper and lower limits of Cu (upper and lower limit values of Cu content).

TABLE 1

| | Composition (mass %) | | | | | | | | | | | | | | |
|---|---|---|---|---|---|---|---|---|---|---|---|---|---|---|---|
| No | Cr | Fe | Cu | P | Si | B | C | Mo | Co | Mn | V | Sn | Zn | Bi | Ni |
| 1 | 15 | 15 | 6.0 | 5 | 4 | 0.0 | 0.0 | 0 | 0 | 0 | 0 | 0 | 0 | 0 | balance |
| 2 | 20 | 23 | 5.0 | 6 | 3 | 0.0 | 0.0 | 0 | 0 | 0 | 0 | 0 | 0 | 0 | balance |
| 3 | 23 | 17 | 4.0 | 7 | 0 | 0.0 | 0.0 | 0 | 0 | 0 | 0 | 0 | 0 | 0 | balance |
| 4 | 25 | 23 | 3.0 | 7 | 3 | 0.0 | 0.0 | 0 | 0 | 0 | 0 | 0 | 0 | 0 | balance |
| 5 | 30 | 24 | 2.5 | 8 | 2 | 0.0 | 0.0 | 0 | 0 | 0 | 0 | 0 | 0 | 0 | balance |
| 6 | 22 | 15 | 4.0 | 8 | 1 | 0.0 | 0.0 | 0 | 0 | 0 | 0 | 0 | 0 | 0 | balance |
| 7 | 23 | 17 | 4.0 | 7 | 5 | 0.0 | 0.0 | 0 | 0 | 0 | 0 | 0 | 0 | 0 | balance |
| 8 | 21 | 23 | 4.0 | 6 | 5 | 0.0 | 0.0 | 0 | 0 | 0 | 0 | 0 | 0 | 0 | balance |
| 9 | 23 | 25 | 4.0 | 5 | 5 | 0.0 | 0.0 | 0 | 0 | 0 | 0 | 0 | 0 | 0 | balance |
| 10 | 23 | 30 | 4.0 | 5 | 5 | 0.0 | 0.0 | 0 | 0 | 0 | 0 | 0 | 0 | 0 | balance |
| 11 | 23 | 20 | 2.5 | 5 | 4 | 0.0 | 0.0 | 0 | 0 | 0 | 0 | 0 | 0 | 0 | balance |
| 12 | 23 | 20 | 3.0 | 5 | 6 | 0.0 | 0.0 | 0 | 0 | 0 | 0 | 0 | 0 | 0 | balance |
| 13 | 23 | 20 | 4.0 | 7 | 4 | 0.0 | 0.0 | 0 | 0 | 0 | 0 | 0 | 0 | 0 | balance |
| 14 | 23 | 20 | 5.0 | 7 | 5 | 0.0 | 0.0 | 0 | 0 | 0 | 0 | 0 | 0 | 0 | balance |
| 15 | 23 | 20 | 6.0 | 5 | 6 | 0.0 | 0.0 | 0 | 0 | 0 | 0 | 0 | 0 | 0 | balance |
| 16 | 23 | 20 | 7.0 | 5 | 5 | 0.0 | 0.0 | 0 | 0 | 0 | 0 | 0 | 0 | 0 | balance |

TABLE 1-continued

| No | Cr | Fe | Cu | P | Si | B | C | Mo | Co | Mn | V | Sn | Zn | Bi | Ni |
|---|---|---|---|---|---|---|---|---|---|---|---|---|---|---|---|
| 17 | 23 | 20 | 4.0 | 3 | 8 | 0.0 | 0.0 | 0 | 0 | 0 | 0 | 0 | 0 | 0 | balance |
| 18 | 23 | 20 | 4.0 | 5 | 5 | 0.0 | 0.0 | 0 | 0 | 0 | 0 | 0 | 0 | 0 | balance |
| 19 | 23 | 20 | 4.0 | 6 | 4 | 0.0 | 0.0 | 0 | 0 | 0 | 0 | 0 | 0 | 0 | balance |
| 20 | 23 | 20 | 4.0 | 8 | 6 | 0.0 | 0.0 | 0 | 0 | 0 | 0 | 0 | 0 | 0 | balance |
| 21 | 23 | 20 | 4.0 | 12 | 0 | 0.0 | 0.0 | 0 | 0 | 0 | 0 | 0 | 0 | 0 | balance |
| 22 | 23 | 20 | 4.0 | 11 | 0 | 0.0 | 0.0 | 0 | 0 | 0 | 0 | 0 | 0 | 0 | balance |
| 23 | 23 | 20 | 4.0 | 7 | 3 | 0.0 | 0.0 | 0 | 0 | 0 | 0 | 0 | 0 | 0 | balance |
| 24 | 23 | 20 | 4.0 | 7 | 4 | 0.0 | 0.0 | 0 | 0 | 0 | 0 | 0 | 0 | 0 | balance |
| 25 | 23 | 20 | 4.0 | 7 | 6 | 0.0 | 0.0 | 0 | 0 | 0 | 0 | 0 | 0 | 0 | balance |
| 26 | 23 | 20 | 4.0 | 5 | 8 | 0.0 | 0.0 | 0 | 0 | 0 | 0 | 0 | 0 | 0 | balance |
| 27 | 23 | 20 | 4.0 | 7 | 4 | 0.3 | 0.0 | 0 | 0 | 0 | 0 | 0 | 0 | 0 | balance |
| 28 | 23 | 20 | 4.0 | 7 | 4 | 0.0 | 0.3 | 0 | 0 | 0 | 0 | 0 | 0 | 0 | balance |
| 29 | 23 | 20 | 4.0 | 7 | 4 | 0.5 | 0.5 | 0 | 0 | 0 | 0 | 0 | 0 | 0 | balance |
| 30 | 23 | 20 | 4.0 | 7 | 4 | 0.0 | 0.0 | 1 | 0 | 0 | 0 | 0 | 0 | 0 | balance |

| | | | | | | Centrifugal cast steel | | | Braze material | | |
|---|---|---|---|---|---|---|---|---|---|---|---|
| No | Cr + Fe | P + Si | B + C | Mo + Co + Mn + V | Sn + Zn + Bi | Bending strength | Liquidus line | Solidus line | Bending strength | Corrosion resistance | Remarks |
| 1 | 30 | 9 | 0.0 | 0 | 0 | C | B | A | C | A | Present |
| 2 | 43 | 9 | 0.0 | 0 | 0 | B | B | B | B | A | Invention |
| 3 | 40 | 7 | 0.0 | 0 | 0 | A | C | B | A | A | Examples |
| 4 | 48 | 10 | 0.0 | 0 | 0 | B | A | C | B | A | |
| 5 | 54 | 10 | 0.0 | 0 | 0 | C | A | C | C | A | |
| 6 | 37 | 9 | 0.0 | 0 | 0 | A | B | B | A | A | |
| 7 | 40 | 12 | 0.0 | 0 | 0 | A | B | B | A | A | |
| 8 | 44 | 11 | 0.0 | 0 | 0 | A | A | B | A | A | |
| 9 | 48 | 10 | 0.0 | 0 | 0 | A | A | B | A | A | |
| 10 | 53 | 10 | 0.0 | 0 | 0 | A | A | B | A | A | |
| 11 | 43 | 9 | 0.0 | 0 | 0 | C | B | C | C | A | |
| 12 | 43 | 11 | 0.0 | 0 | 0 | B | A | C | B | A | |
| 13 | 43 | 11 | 0.0 | 0 | 0 | A | A | B | A | A | |
| 14 | 43 | 12 | 0.0 | 0 | 0 | B | B | B | B | A | |
| 15 | 43 | 11 | 0.0 | 0 | 0 | C | A | A | C | A | |
| 16 | 43 | 10 | 0.0 | 0 | 0 | C | A | A | C | A | |
| 17 | 43 | 11 | 0.0 | 0 | 0 | A | A | B | A | A | |
| 18 | 43 | 10 | 0.0 | 0 | 0 | A | A | B | A | A | |
| 19 | 43 | 10 | 0.0 | 0 | 0 | A | A | B | A | A | |
| 20 | 43 | 14 | 0.0 | 0 | 0 | A | C | B | A | A | |
| 21 | 43 | 12 | 0.0 | 0 | 0 | A | B | B | A | A | |
| 22 | 43 | 11 | 0.0 | 0 | 0 | A | A | B | A | A | |
| 23 | 43 | 10 | 0.0 | 0 | 0 | A | A | B | A | A | |
| 24 | 43 | 11 | 0.0 | 0 | 0 | A | A | B | A | A | |
| 25 | 43 | 13 | 0.0 | 0 | 0 | A | C | B | A | A | |
| 26 | 43 | 13 | 0.0 | 0 | 0 | A | C | B | A | A | |
| 27 | 43 | 11 | 0.3 | 0 | 0 | A | A | B | A | A | |
| 28 | 43 | 11 | 0.3 | 0 | 0 | A | A | B | A | A | |
| 29 | 43 | 11 | 1.0 | 0 | 0 | A | A | B | A | A | |
| 30 | 43 | 11 | 0.0 | 1 | 0 | A | A | B | A | A | |

TABLE 2

| | Composition (mass %) | | | | | | | | | | | | | | |
|---|---|---|---|---|---|---|---|---|---|---|---|---|---|---|---|
| No | Cr | Fe | Cu | P | Si | B | C | Mo | Co | Mn | V | Sn | Zn | Bi | Ni |
| 31 | 23 | 20 | 4.0 | 7 | 4 | 0.0 | 0.0 | 0 | 5 | 0 | 0 | 0 | 0 | 0 | balance |
| 32 | 23 | 20 | 4.0 | 7 | 4 | 0.0 | 0.0 | 0 | 0 | 5 | 0 | 0 | 0 | 0 | balance |
| 33 | 23 | 20 | 4.0 | 7 | 4 | 0.0 | 0.0 | 0 | 0 | 0 | 1 | 0 | 0 | 0 | balance |
| 34 | 23 | 20 | 4.0 | 7 | 4 | 0.0 | 0.0 | 1 | 1 | 2 | 1 | 0 | 0 | 0 | balance |
| 35 | 23 | 20 | 4.0 | 7 | 4 | 0.0 | 0.0 | 0 | 0 | 0 | 0 | 0.3 | 0 | 0 | balance |
| 36 | 23 | 20 | 4.0 | 7 | 4 | 0.0 | 0.0 | 0 | 0 | 0 | 0 | 0 | 0.3 | 0 | balance |
| 37 | 23 | 20 | 4.0 | 7 | 4 | 0.0 | 0.0 | 0 | 0 | 0 | 0 | 0 | 0 | 0.3 | balance |
| 38 | 23 | 20 | 4.0 | 7 | 4 | 0.0 | 0.0 | 0 | 0 | 0 | 0 | 1 | 0.5 | 0.5 | balance |
| 39 | 23 | 20 | 4.0 | 7 | 4 | 0.5 | 0.0 | 0 | 1 | 1 | 0 | 0.5 | 0 | 0 | balance |
| 40 | 14 | 16 | 6.0 | 5 | 4 | 0.0 | 0.0 | 0 | 0 | 0 | 0 | 0 | 0 | 0 | balance |
| 41 | 31 | 23 | 2.5 | 8 | 2 | 0.0 | 0.0 | 0 | 0 | 0 | 0 | 0 | 0 | 0 | balance |
| 42 | 23 | 14 | 4.0 | 8 | 1 | 0.0 | 0.0 | 0 | 0 | 0 | 0 | 0 | 0 | 0 | balance |
| 43 | 22 | 31 | 4.0 | 5 | 5 | 0.0 | 0.0 | 0 | 0 | 0 | 0 | 0 | 0 | 0 | balance |
| 44 | 23 | 20 | 2.0 | 5 | 4 | 0.0 | 0.0 | 0 | 0 | 0 | 0 | 0 | 0 | 0 | balance |
| 45 | 23 | 20 | 8.0 | 5 | 5 | 0.0 | 0.0 | 0 | 0 | 0 | 0 | 0 | 0 | 0 | balance |
| 46 | 23 | 20 | 4.0 | 2 | 8 | 0.0 | 0.0 | 0 | 0 | 0 | 0 | 0 | 0 | 0 | balance |
| 47 | 23 | 20 | 4.0 | 13 | 0 | 0.0 | 0.0 | 0 | 0 | 0 | 0 | 0 | 0 | 0 | balance |
| 48 | 23 | 20 | 4.0 | 5 | 9 | 0.0 | 0.0 | 0 | 0 | 0 | 0 | 0 | 0 | 0 | balance |
| 49 | 15 | 14 | 6.0 | 5 | 4 | 0.0 | 0.0 | 0 | 0 | 0 | 0 | 0 | 0 | 0 | balance |
| 50 | 30 | 25 | 2.5 | 8 | 2 | 0.0 | 0.0 | 0 | 0 | 0 | 0 | 0 | 0 | 0 | balance |

TABLE 2-continued

| | | | | | | | | | | | | | | |
|---|---|---|---|---|---|---|---|---|---|---|---|---|---|---|
| 51 | 23 | 17 | 4.0 | 6 | 0 | 0.0 | 0.0 | 0 | 0 | 0 | 0 | 0 | 0 | 0 | balance |
| 52 | 23 | 20 | 4.0 | 6 | <u>9</u> | 0.0 | 0.0 | 0 | 0 | 0 | 0 | 0 | 0 | 0 | balance |
| 53 | 23 | 20 | 4.0 | 7 | 4 | 1.0 | 0.5 | 0 | 0 | 0 | 0 | 0 | 0 | 0 | balance |
| 54 | 23 | 20 | 4.0 | 7 | 4 | 0.0 | 0.0 | 0 | 6 | 0 | 0 | 0 | 0 | 0 | balance |
| 55 | 23 | 20 | 4.0 | 7 | 4 | 0.0 | 0.0 | 0 | 0 | 6 | 0 | 0 | 0 | 0 | balance |
| 56 | 23 | 20 | 4.0 | 7 | 4 | 0.0 | 0.0 | 1 | 1 | 2 | 2 | 0 | 0 | 0 | balance |
| 57 | 23 | 20 | 4.0 | 7 | 4 | 0.0 | 0.0 | 0 | 0 | 0 | 0 | 1 | 1 | 0.5 | balance |

| | | | | | | Centrifugal cast steel | | | Braze material | | |
|---|---|---|---|---|---|---|---|---|---|---|---|
| No | Cr + Fe | P + Si | B + C | Mo + Co + Mn + V | Sn + Zn + Bi | Bending strength | Liquidus line | Solidus line | Bending strength | Corrosion resistance | Remarks |
| 31 | 43 | 11 | 0.0 | 5 | 0 | A | A | B | A | A | Present |
| 32 | 43 | 11 | 0.0 | 5 | 0 | A | A | B | A | A | Invention |
| 33 | 43 | 11 | 0.0 | 1 | 0 | A | A | B | A | A | Examples |
| 34 | 43 | 11 | 0.0 | 5 | 0 | A | A | B | A | A | |
| 35 | 43 | 11 | 0.0 | 0 | 0.3 | A | A | B | A | A | |
| 36 | 43 | 11 | 0.0 | 0 | 0.3 | A | A | B | A | A | |
| 37 | 43 | 11 | 0.0 | 0 | 0.3 | A | A | B | A | A | |
| 38 | 43 | 11 | 0.0 | 0 | 2 | A | A | B | A | A | |
| 39 | 43 | 11 | 0.5 | 2 | 0.5 | A | A | B | A | A | |
| 40 | 30 | 9 | 0.0 | 0 | 0 | C | B | A | C | C | Comparative |
| 41 | 54 | 10 | 0.0 | 0 | 0 | C | D | C | C | A | Examples |
| 42 | 37 | 9 | 0.0 | 0 | 0 | D | B | B | D | A | |
| 43 | 53 | 10 | 0.0 | 0 | 0 | A | D | B | A | A | |
| 44 | 43 | 9 | 0.0 | 0 | 0 | D | B | C | D | A | |
| 45 | 43 | 10 | 0.0 | 0 | 0 | D | A | A | D | C | |
| 46 | 43 | 10 | 0.0 | 0 | 0 | A | D | D | A | A | |
| 47 | 43 | 13 | 0.0 | 0 | 0 | D | D | B | D | A | |
| 48 | 43 | 14 | 0.0 | 0 | 0 | D | D | B | D | B | |
| 49 | <u>29</u> | 9 | 0.0 | 0 | 0 | D | B | A | D | A | |
| 50 | <u>55</u> | 10 | 0.0 | 0 | 0 | D | A | C | D | A | |
| 51 | 40 | <u>6</u> | 0.0 | 0 | 0 | A | D | B | A | A | |
| 52 | 43 | <u>15</u> | 0.0 | 0 | 0 | D | D | B | D | A | |
| 53 | 43 | 11 | <u>1.5</u> | 0 | 0 | A | D | B | A | C | |
| 54 | 43 | 11 | 0.0 | <u>6</u> | 0 | A | D | B | A | A | |
| 55 | 43 | 11 | 0.0 | <u>6</u> | 0 | A | D | B | A | A | |
| 56 | 43 | 11 | 0.0 | <u>6</u> | 0 | A | D | B | A | A | |
| 57 | 43 | 11 | 0.0 | 0 | <u>2.5</u> | D | A | B | D | A | |

Note:
Underlined figures are outside the conditions as required in the present invention.

As shown in Tables 1 and 2, Nos. 1 to 39 are present invention examples, while Nos. 40 to 57 are comparative examples (Experiment B).

Comparative Example No. 40 shown in Table 2 was inferior in the corrosion resistance of the braze material due to the low Cr content. Comparative Example No. 41 showed an increase in the liquidus-line temperature of the centrifugal cast steel due to the high Cr content. Comparative Example No. 42 was inferior in the bending strengths of both of the centrifugal cast steel and the braze material due to the low Fe content. Comparative Example No. 43 showed an increase in the liquidus-line temperature of the centrifugal cast steel due to the high Fe content. Comparative Example No. 44 was inferior in the bending strengths of both of the centrifugal cast steel and the braze material due to the low Cu content. Comparative Example No. 45 was inferior in the bending strengths of both of the centrifugal cast steel and the braze material, and was inferior in the corrosion resistance of the braze material due to the high Cu content.

Comparative Example No. 46 showed increases in the liquidus-line temperature and solidus-line temperature of the centrifugal cast steel due to the low P content. Comparative Example No. 47 was inferior in the bending strength of the centrifugal cast steel, showed an increase in the liquidus-line temperature, and was inferior in the bending strength of the braze material due to the high P content. Comparative Example No. 48 was inferior in the bending strength of the centrifugal cast steel, showed an increase in the liquidus-line temperature, was inferior in the bending strength of the braze material due to the high Si content. Comparative Example No. 49 was inferior in the bending strengths of the centrifugal cast steel and the braze material due to the low Fe content and the low value of Cr+Fe.

Comparative Example No. 50 was inferior in the bending strengths of the centrifugal cast steel and the braze material due to the high value of Cr+Fe. Comparative Example No. 51 showed an increase in the liquidus-line temperature of the centrifugal cast steel due to the low value of P+Si. Comparative Example No. 52 was inferior in the bending strengths of the centrifugal cast steel and the braze material, and showed an increase in the liquidus-line temperature of the centrifugal cast steel due to the high Si content and the high value of P+Si. Comparative Example No. 53 showed an increase in the liquidus-line temperature of the centrifugal cast steel, and was inferior in the corrosion resistance of the braze material due to the high value of B+C.

Comparative Example Nos. 54 to 56 showed increases in the liquidus-line temperatures of the centrifugal cast steels due to the high values of Mo+Co+Mn+V. Comparative Example No. 57 was inferior in the bending strengths of the centrifugal cast steel and the braze material due to the high value of Si+Zn+Bi. In contrast, it can be understood that all of Nos. 1 to 39 which are present invention examples have the high bending strengths of the centrifugal cast steels, show the low liquidus-line temperature and the low solidus-line temperature which are not increased, have the high bending strengths of the braze materials, and, in addition, are superior in corrosion resistance because of satisfying the conditions of the present invention.

As described above, in accordance with the present invention, a decrease in melting point and an increase in strength are possible, and there is provided a Ni—Cr—Fe-based alloy brazing filler material which has a low melting temperature, and is inexpensive and excellent in corrosion resistance and in strength, for use in manufacture of stainless-steel heat exchangers or the like.

The invention claimed is:

1. A Ni—Cr—Fe-based alloy brazing filler material, consisting of, in mass %,
   15 to 30% of Cr;
   15 to 30% of Fe;
   2.1 to 7.5% of Cu;
   3 to 6% of P;
   1 to 4% of Si;
   0 to 1% in total of at least one of B and C;
   0 to 5% in total of at least one of Mo, Co, Mn, and V;
   0 to 2% in total of at least one of Sn, Zn, and Bi;
   the balance being Ni and unavoidable impurities,
   wherein the total content of Cr and Fe is 30 to 54%, and the total content of P and Si is 7 to 10%,
   and wherein the Ni—Cr—Fe based alloy brazing filler material has a liquidus-line temperature of less than 1050° C.

2. The Ni—Cr—Fe-based alloy brazing filler material according to claim 1, wherein the content of Cu is more than 2.5% and less than 6%.

3. The Ni—Cr—Fe-based alloy brazing filler material according to claim 1, wherein the total content of P+Si is more than 8% and 10% or less.

4. The Ni—Cr—Fe-based alloy brazing filler material according to claim 1, wherein the content of Cu is more than 3% and less than 6%, and the total content of P+Si is more than 8% and 10% or less.

* * * * *